US012345379B2

(12) United States Patent
Wei et al.

(10) Patent No.: US 12,345,379 B2
(45) Date of Patent: Jul. 1, 2025

(54) INTEGRATED INSTALLATION STRUCTURE FOR MARINE APPARATUS, STORAGE CONTAINER AND MANUFACTURING METHOD

(71) Applicant: SINOTECH ENERGY CO., LTD., Shanghai (CN)

(72) Inventors: Ying Wei, Shanghai (CN); Wei He, Shanghai (CN)

(73) Assignee: SINOTECH ENERGY CO., LTD., Shanghai (CN)

( * ) Notice: Subject to any disclaimer, the term of this patent is extended or adjusted under 35 U.S.C. 154(b) by 0 days.

(21) Appl. No.: 19/026,984

(22) Filed: Jan. 17, 2025

(65) Prior Publication Data

US 2025/0155082 A1 May 15, 2025

Related U.S. Application Data

(63) Continuation of application No. PCT/CN2024/114709, filed on Aug. 27, 2024.

(30) Foreign Application Priority Data

Aug. 22, 2024 (CN) ......................... 202411156481.5

(51) Int. Cl.
*F17C 3/02* (2006.01)

(52) U.S. Cl.
CPC ...... *F17C 3/027* (2013.01); *F17C 2203/0358* (2013.01); *F17C 2203/0604* (2013.01); *F17C 2270/0107* (2013.01)

(58) Field of Classification Search
CPC .... F17C 3/00; F17C 3/027; F17C 3/02; F17C 2203/0358; F17C 2203/0604; F17C 2270/0107
USPC ........................................................ 114/74 A
See application file for complete search history.

(56) References Cited

FOREIGN PATENT DOCUMENTS

| | | | | | |
|---|---|---|---|---|---|
| CN | 104955722 | A | * | 9/2015 | ............. F17C 3/027 |
| CN | 112498584 | A | | 3/2021 | |
| CN | 113432031 | A | * | 9/2021 | ............. F17C 3/027 |
| CN | 115432124 | A | | 12/2022 | |
| CN | 118270179 | A | | 7/2024 | |
| JP | H0585463 | A | | 4/1993 | |
| KR | 20120134596 | A | | 12/2012 | |
| WO | 8909909 | A1 | | 10/1989 | |

* cited by examiner

*Primary Examiner* — Lars A Olson

(57) ABSTRACT

Disclosed are an integrated installation structure for a marine apparatus, a storage container and a manufacturing method. The integrated installation structure includes a primary insulating layer formed by arranging at least one first primary insulating plate and at least one second primary insulating plate, a secondary insulating layer disposed on an outer side of the primary insulating layer and a secondary shielding film between the primary insulating layer and the secondary insulating layer. The first primary insulating plate is prefabricated and connected with the secondary shielding film into a one-piece member through a first connecting device, and the second primary insulating plate is a structure separated from the secondary shielding film, and is connected with the secondary insulating layer through a second connecting device.

25 Claims, 26 Drawing Sheets

INTEGRATED INSTALLATION STRUCTURE FOR MARINE APPARATUS, STORAGE CONTAINER AND MANUFACTURING METHOD

CROSS-REFERENCE TO RELATED APPLICATIONS

This application is a continuation of International Patent Application No. PCT/CN2024/114709, filed on Apr. 27, 2024, which claims the benefit of priority from Chinese Patent Application No. 202411156481.5, filed on Apr. 22, 2024. The content of the aforementioned application, including any intervening amendments thereto, is incorporated herein by reference in its entirety.

TECHNICAL FIELD

The present application relates to the technical field of marine apparatuses, and particularly to an integrated installation structure for a marine apparatus, a storage container with the integrated installation structure and a corresponding manufacturing method.

BACKGROUND

Transportation of LNG typically relies on transport apparatuses, e.g., marine equipment such as ships. In the related art, marine cargo tanks are usually used to store related media. Container walls of the marine cargo tanks are typically of a multi-layer structure including an insulating layer, a thin film shielding layer and the like. Currently, all layers are often connected together using screws by way of gate-type wedges in the prior art. However, the screw connection is unfavorable to the sealing of the container wall and prone to coolant leakage. Some of solutions avoid the problem of seal leakage by removing the connection in the form of gate-type wedges. The bearing capacity at a fixing point will be greatly reduced due to the removal of the gate-type wedges. Therefore, structures such as the insulating layers are divided into small blocks to reduce the weight and ensure a certain stiffness. However, the way to install such blocks is complex in structure, complicated in procedure, long in construction period and low in installation efficiency.

SUMMARY

Technical Problem

Therefore, there is a need to provide an integrated installation structure for a marine apparatus, a storage container with the integrated installation structure and a corresponding manufacturing method to at least partially solve the above problems.

Technical Solution

The purpose of the present application is to provide an integrated installation structure for a marine apparatus, a storage container with the integrated installation structure and a corresponding manufacturing method, which may greatly reduce the on-site working hours in the storage container, especially the aerial working hours during the on-site construction, being favorable to accelerating the construction and improving the construction safety.

An aspect of the present application provides an integrated installation structure for a marine apparatus, which is configured to constitute at least part of a wall of a storage container, wherein the integrated installation structure comprises:

- a primary insulating layer formed by arranging at least one first primary insulating plate and at least one second primary insulating plate;
- a secondary insulating layer that is disposed an outer side of the primary insulating layer defined according to the storage container, and is formed by arranging a secondary insulating plate; and
- a secondary shielding film disposed between the primary insulating layer and the secondary insulating layer, wherein the first primary insulating plate is prefabricated and connected with the secondary shielding film into a one-piece member through a first connecting device, and the second primary insulating plate is a structure separated from the secondary shielding film and is connected with the secondary insulating plate through a second connecting device.

In some embodiments, each second primary insulating plate is arranged adjacent to at least one of the first primary insulating plates, and/or any two of the second primary insulating plates are not adjacent.

In some embodiments, the first connecting device includes:

- a first anchoring element connected to an inner side surface of the secondary shielding film; and
- a first fastening element penetrating through the first primary insulating plate and the first anchoring element to fasten the first primary insulating plate and the first anchoring element together.

In some embodiments, a first recess is disposed at an outer side surface of the first primary insulating plate facing the secondary shielding film, and at least part of the first anchoring element is accommodated in the first recess when the first primary insulating plate and the secondary shielding film are prefabricated and connected into the one-piece member.

In some embodiments, the first anchoring element comprises a flat plate portion connected to the secondary shielding film and a ridge portion protruding relative to the flat plate portion, and the first fastening element penetrates through the first primary insulating plate and is securely connected to the ridge portion.

In some embodiments, the first fastening element comprises a connecting post and a cap at an end of the connecting post, wherein a second recess is disposed at an inner side surface of the first primary insulating plate facing away from the secondary shielding film, and the cap is accommodated in the second recess and is below the inner side surface of the first primary insulating plate. The cap may be, for example, a radially enlarged end of a rivet after riveting.

In some embodiments, the first connecting device includes:

- a first connecting post connected to an inner side surface of the secondary shielding film;
- a first anchoring element disposed on the first primary insulating plate, wherein the first connecting post penetrates through the first anchoring element; and
- a first fastening element connected to the first connecting post at an inner side of the first anchoring element so as to fasten the first anchoring element and the secondary shielding film together.

In some embodiments, a second recess is disposed at an inner side surface of the first primary insulating plate facing away from the secondary shielding film, wherein the first anchoring element is disposed in the second recess and supported by a bottom surface of the second recess. Preferably, the first fastening element is accommodated in the second recess and is below the inner side surface of the first primary insulating plate.

In some embodiments, the second connecting device includes:

- a second outer anchoring element disposed on an inner side surface of the secondary insulating plate facing the secondary shielding film,
- a second inner anchoring element disposed on the second primary insulating plate, and
- a second fastening element, wherein the secondary shielding film has a through hole, and the second fastening element penetrates through the second inner anchoring element and the secondary shielding film from an inner side of the second inner anchoring element and is connected to the second outer anchoring element, thereby fastening the second primary insulating plate, the secondary shielding film and the secondary insulating plate together.

In some embodiments, the second outer anchoring element is configured as a plate-like structure provided with a first fixing hole. The first fixing hole through which the second fastening element penetrates is securely connected to a nut, or the first fixing hole has a threaded portion disposed therein, and the second fastening element is connected to the first fixing hole through the threaded portion.

In some embodiments, the plate-like structure is provided with a bump portion protruding from an inner side surface facing the secondary shielding film, the through hole of the secondary shielding film has approximately the same shape as the bump portion for the bump portion to penetrate through; and the secondary shielding film is welded to the bump portion. Preferably, an installation slot is disposed at the inner side surface of the secondary insulating plate, and the plate-like structure is embedded in the installation slot. Preferably, the plate-like structure is fastened in the installation slot through additional fasteners. Preferably, a fourth recess is disposed at an outer side surface of the second primary insulating plate facing the secondary shielding film, and at least part of the bump portion is accommodated in the fourth recess in an installed state.

In some embodiments, the second connecting device includes:

- a second inner anchoring element disposed on the second primary insulating plate,
- a second outer anchoring element disposed on an inner side surface of the secondary insulating plate facing the secondary shielding film, wherein the second outer anchoring element has a second connecting post extending towards the secondary shielding film and penetrating through the secondary shielding film and the second inner anchoring element; and
- a second fastening element connected to the second connecting post at an inner side of the second inner anchoring element so as to fasten the second primary insulating plate, the secondary shielding film and the secondary insulating plate together.

In some embodiments, the second outer anchoring element is configured as a plate-like structure, the second connecting post is welded to the plate-like structure, or the second connecting post and the plate-like structure are integrally formed. Preferably, an installation slot is disposed at the inner side surface of the secondary insulating plate, and the plate-like structure is embedded and fastened in the installation slot through additional fasteners.

In some embodiments, a third recess is disposed at the inner side surface of the second primary insulating plate facing away from the secondary shielding film, an anchoring hole penetrating through the second primary insulating plate is disposed in a bottom surface of the third recess, and the second inner anchoring element is disposed in the third recess and supported by the bottom surface of the third recess.

In some embodiments, the second fastening element comprises or forms a cap located on an inner side of the second inner anchoring element, and the second inner anchoring element and the cap of the second fastening element are both accommodated in the third recess and are below the inner side surface of the second primary insulating plate.

In some embodiments, the integrated installation structure further comprises a primary shielding film disposed on an inner side of the primary insulating layer facing away from the secondary shielding film, a third anchoring element is disposed on inner side surfaces of the first primary insulating plate and/or the second primary insulating plate facing the primary shielding film, and the primary shielding film is connected to the third anchoring element.

In some embodiments, the position of the third anchoring element disposed at the first primary insulating plate coincides with the first connecting device along a thickness direction of the first primary insulating plate, and/or the position of the third anchoring element disposed at the second primary insulating plate coincides with the second connecting device along the thickness direction of the first primary insulating plate.

In some embodiments, the third anchoring element is configured as a plate-like structure which is provided with a bump portion protruding from an inner side surface facing the primary shielding film, and the primary shielding film is provided with a through hole for the bump portion to penetrate through, which has approximately the same shape as the bump portion. Preferably, an installation slot is disposed at the inner side surfaces of the first primary insulating plate and/or the second primary insulating plate at which the third anchoring element is provided, and the plate-like structure is embedded in the installation slot. Preferably, the plate-like structure is fastened in the installation slot through additional fasteners.

In some embodiments, the secondary shielding film is configured as a corrugated plate made of a metal material; a plurality of transverse corrugations and a plurality of longitudinal corrugations are formed on the corrugated plate; two adjacent ones of the transverse corrugations and two adjacent ones of the longitudinal corrugations intersect to define one installation area; and one first primary insulating plate or one second primary insulating plate is disposed in each of the installation areas.

Another aspect of the present application provides a storage container comprising the integrated installation structure described above, which forms part of a container wall of the storage container. Preferably, the storage container is a large land-based storage tank.

Still another aspect of the present application provides a manufacturing method for a storage container, comprising:

- manufacturing the secondary insulating layer;
- manufacturing a prefabricated one-piece member including the secondary shielding film and the first primary insulating plate;
- installing the secondary insulating layer to form a secondary insulating box;

fixing the prefabricated one-piece member on an inner side surface of the secondary insulating layer;

laying the second primary insulating plate on an inner side surface of the secondary shielding film and connecting with the secondary insulating layer; and installing a primary shielding film on an inner side of the primary insulating layer. A construction site of the manufacturing method at least comprises a site construction side and a factory prefabricating side. Preferably, at least the step of manufacturing the prefabricated one-piece member is completed at the factory prefabricating side.

Beneficial Effects

According to the solutions of the present application, the process of laying the primary insulating layer is simplified by converting part of installing operations on the construction site into prefabricating operations in the processing factory, so that the aerial working hours during the construction of the storage container can be greatly reduced, which may both accelerate the construction and improve the construction safety.

BRIEF DESCRIPTION OF THE DRAWINGS

For a better understanding of above and other purposes, features, advantages, and functions of the present application, reference may be made to preferred embodiments shown in the drawings. It is to be understood by those skilled in the art that the drawings are intended to schematically illustrate the preferred embodiments of the present application, without any limiting effect on the scope of the present application.

DETAILED DESCRIPTION

The particular embodiments of the present application are described now in detail with reference to the drawings. Only preferred embodiments of the present application are described here, and those skilled in the art could conceive of other ways to implement the present application based on the preferred embodiments, which also fall within the scope of the present application.

The present application provides an integrated installation structure for a marine apparatus, a storage container with the integrated installation structure and a corresponding manufacturing method. The storage container can be used for marine engineering equipment or land engineering equipment, for example for storing liquefied gas such as liquefied natural gas (LNG), liquid nitrogen, liquid oxygen, liquid hydrogen, liquid ammonia, and liquid helium, etc.

It is to be noted first that, directional and positional terms as mentioned in the present application are only illustrative descriptions rather than limiting descriptions. The description about a position of a component should be understood as a relative position rather than an absolute position, and the description about an extension direction of a component should be understood as a relative direction rather than an absolute direction.

Figure 1:
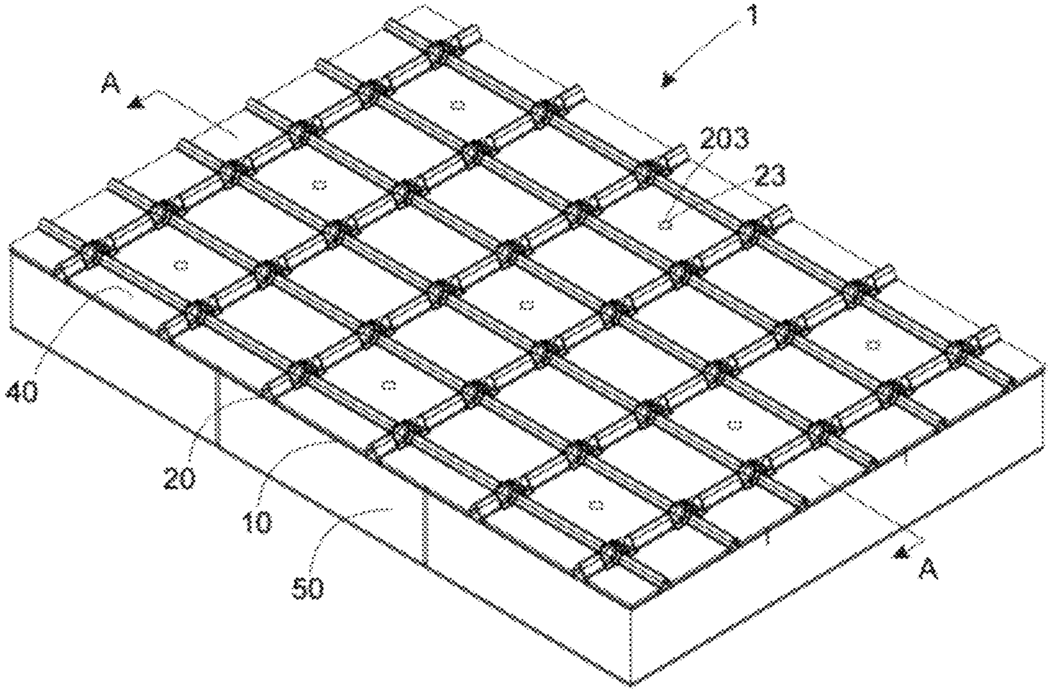
FIG. 1 is a portion of a container wall of a storage container according to a preferred embodiment of the present application, where the container wall includes an integrated installation structure.

FIG. 1 shows an integrated installation structure 1 according to a preferred embodiment of the present application. The integrated installation structure 1 is used to form part of a container wall of a storage container. The integrated installation structure 1 can implement the integrated installation of various components of the container wall (especially various layers of the container wall). Detailed description will be made below in conjunction with the drawings.

Figure 2:
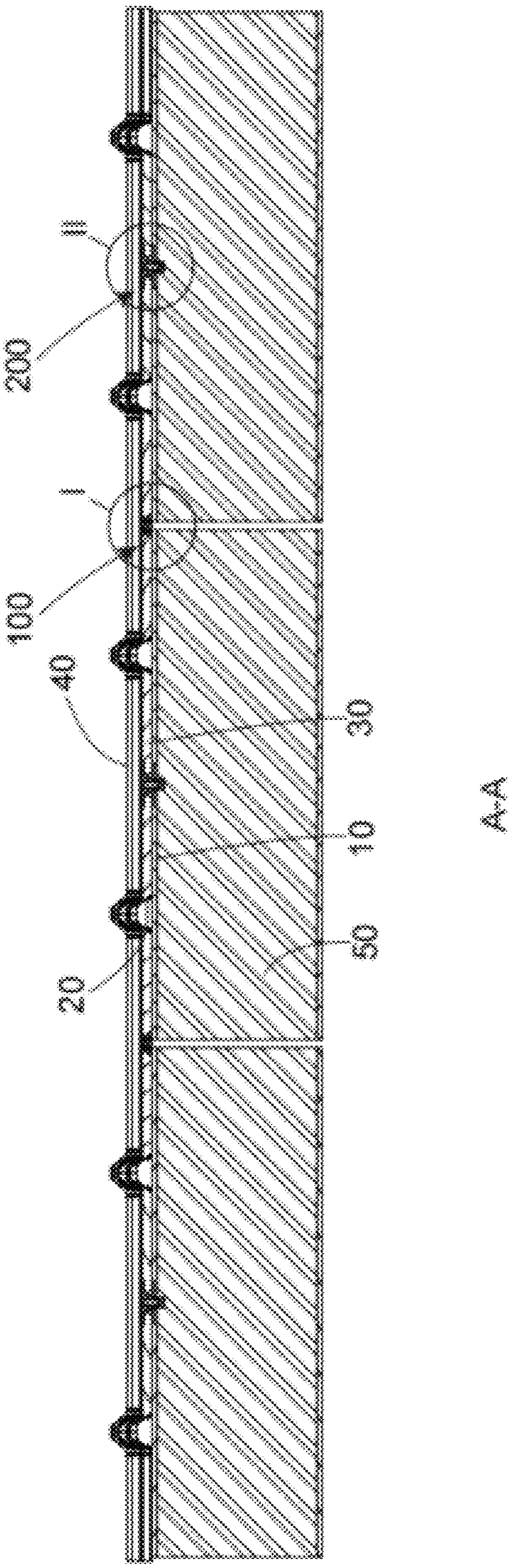
FIG. 2 is a cross-sectional view taken along a line A-A in FIG. 1.

As shown in FIGS. 1 and 2, the integrated installation structure 1 sequentially includes a secondary insulating layer 10, a secondary shielding film 20, a primary insulating layer 30 and a primary shielding film 40 from the outer side to the inner side of the container. That is to say, the primary shielding film 40 is located on the innermost side of the container wall and is in contact with contents (e.g., LNG) in the storage container, and the secondary insulating layer 10 is located on the outermost side and may be connected to a secondary insulating polyurethane layer 50 on the outer side. The secondary insulating layer 10 may be integrally connected and bonded to the secondary insulating polyurethane layer 50 by way of glue bonding to form a secondary insulating box. In practical application, the secondary insulating box may be connected to other portions of the container wall.

Referring to FIGS. 4 to 6, 9 to 11, 18 and 21, the primary insulating layer 30 is formed by arranging at least one first primary insulating plate 31 and at least one second primary insulating plate 32. The first primary insulating plate 31 and the second primary insulating plate 32 each may be configured in the form of a wood plywood. According to the present application, the first primary insulating plate 31 may be connected to the secondary shielding film 20 through a first connecting device to form a one-piece member. The second primary insulating plate 32 may be installed to the secondary shielding film 20 through a second connecting device during the assembly of the storage container. That is, at least part of the primary insulating layer 30 may be prefabricated with the secondary shielding film 20 into a one-piece member in a factory, so that the steps and time required for the on-site construction of the primary insulating layer 30 during the construction of the storage container can be reduced, thereby achieving the purposes of simplifying the process and accelerating the construction. Especially for a large storage container that can hold hundreds of thousands of cubic meters of contents, part of the container wall of the storage container is high up due to the large volume, and the whole installation and construction period has quite a long working time related to aerial work. According to the solutions of the present application, the process of laying the primary insulating layer 30 is simplified by converting part of installing operations on the construction site into prefabricating operations in the factory, so that the aerial working hours during the construction of the storage container can be greatly reduced, which may both accelerate the construction and improve the construction safety.

Figure 3:
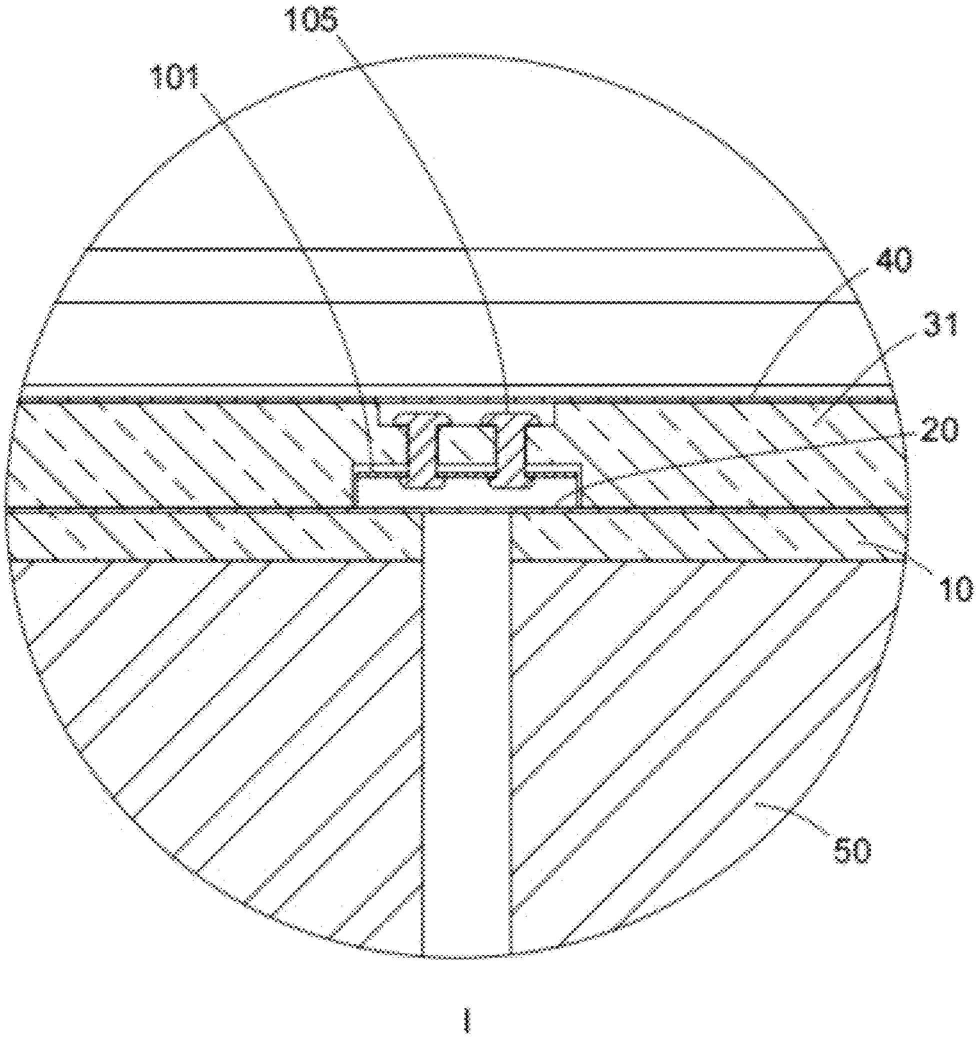
FIG. 3 is a partial enlarged diagram of a portion I in FIG. 2.

FIGS. 2 and 3 show a first connecting device 100 according to a preferred embodiment. Particularly, the first connecting device 100 includes a first anchor 101 and a first fastener 105, where the first anchor 101 is connected to an inner side surface of the secondary shielding film 20. The first fastener 105 penetrates through the first primary insulating plate 31 and is connected to the first anchor 101, so that the first primary insulating plate 31 is connected to the secondary shielding film 20 through the first anchor 101 to form a one-piece member.

Figure 4:
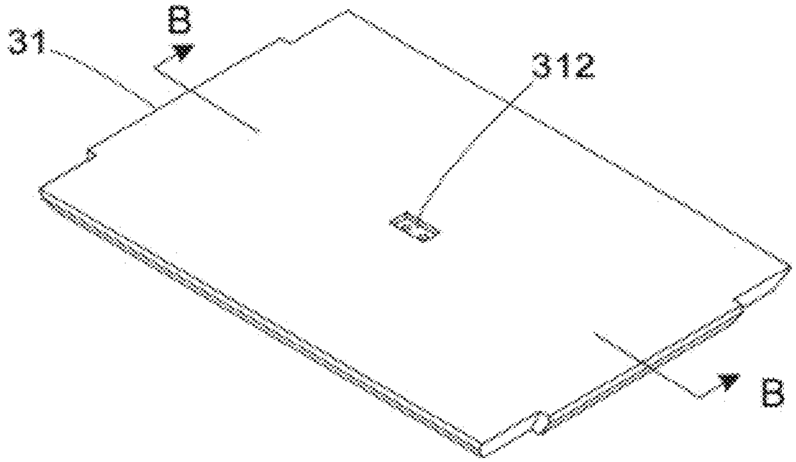
FIG. 4 is a perspective diagram of a first primary insulating plate.
Figure 5:
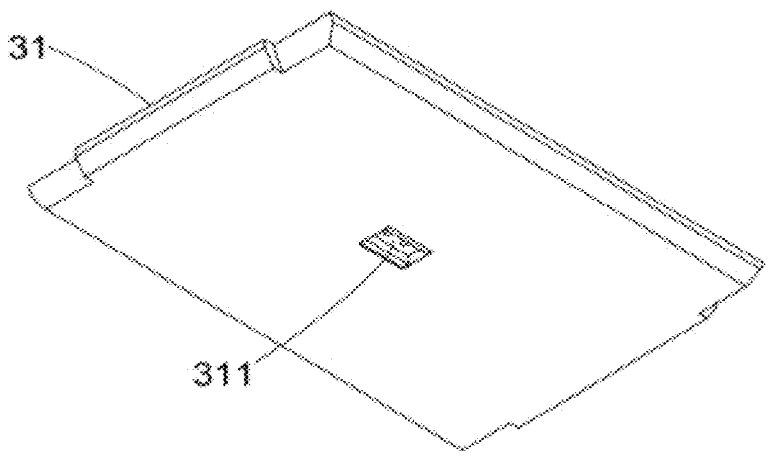
FIG. 5 is another perspective diagram of a first primary insulating plate.
Figure 6:
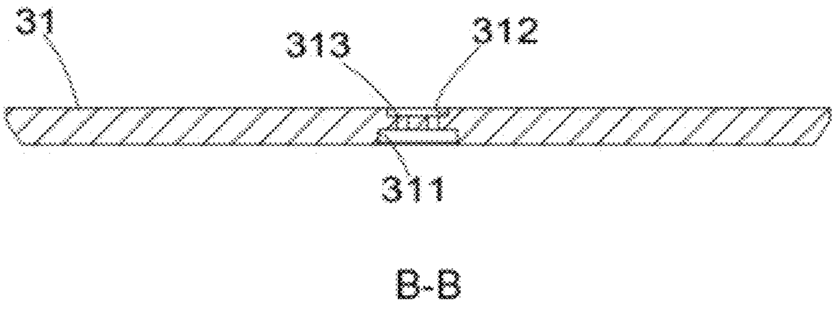
FIG. 6 is a cross-sectional view taken along a line B-B in FIG. 4.

As shown in FIGS. 4 to 6, a first recess 311 is disposed on an outer side surface of the first primary insulating plate 31 facing the secondary shielding film 20. At least part of the first anchor 101 is accommodated in the first recess 311 when the first primary insulating plate 31 and the secondary shielding film 20 are prefabricated and connected into a one-piece member. Preferably, the first anchor 101 is entirely accommodated in the first recess 311. As such, the interfere between the first primary insulating plate 31 and the secondary shielding film 20 caused by the first anchor 101 can be prevented, allowing both of them to fit closely.

Figure 7:
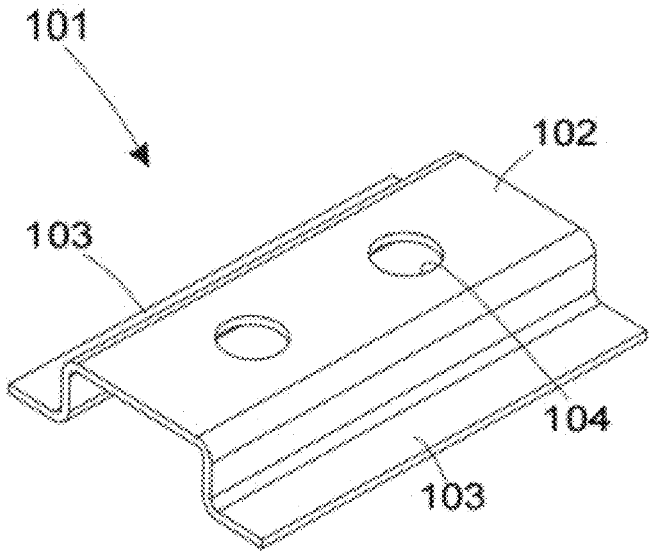
FIG. 7 is a schematic diagram of a preferred embodiment of a first anchoring element.

FIG. 7 shows a preferred embodiment of the first anchor 101, which includes a flat plate portion 103 and a ridge portion 102 protruding relative to the flat plate portion 103. The flat plate portion 103 is configured to connect to the secondary shielding film 20. In some embodiments, the first anchor 101 and the secondary shielding film 20 may be both made of a metal material, and the flat plate portion 103 may be connected to the secondary shielding film 20 by welding or the like. At least one connecting hole 104 is disposed at the top of the ridge portion 102 for connecting to the first fastener 105. Preferably, the first anchor 101 may be configured as a flat plate structure, and the ridge portion 102 and the connecting hole 104 are formed by stamping or the like.

In some embodiments, the first fastener 105 may be a rivet fastener penetrating through a first anchoring hole 313 of the first primary insulating plate 31 and the connecting hole 104 of the ridge portion 102 to achieve tight connection. It may be understood that in other embodiments, the first fastener 105 may also include a screw, a bolt and nut, a pin or any other part suitable for fastening two or more separated elements into a whole. As can be seen from FIG. 3, the first fastener 105 includes a connecting post for penetrating through these elements, and radially enlarged caps at both ends of the connecting post for fastening. The cap at the lower end is accommodated in an inner space of the ridge portion 102. A second recess 312 is disposed on the inner side surface of the first primary insulating plate 31 facing away from the secondary shielding film 20. The cap at the upper end is accommodated in the second recess 312. Preferably, the cap described above is completely accommodated in the second recess 312, i.e., it is below the inner side surface of the first primary insulating plate 31. In this way, the interfere to the subsequent fitting between the primary shielding film 40 and the primary insulating layer 30 caused by the first fastener 105 may be prevented.

Figure 23:
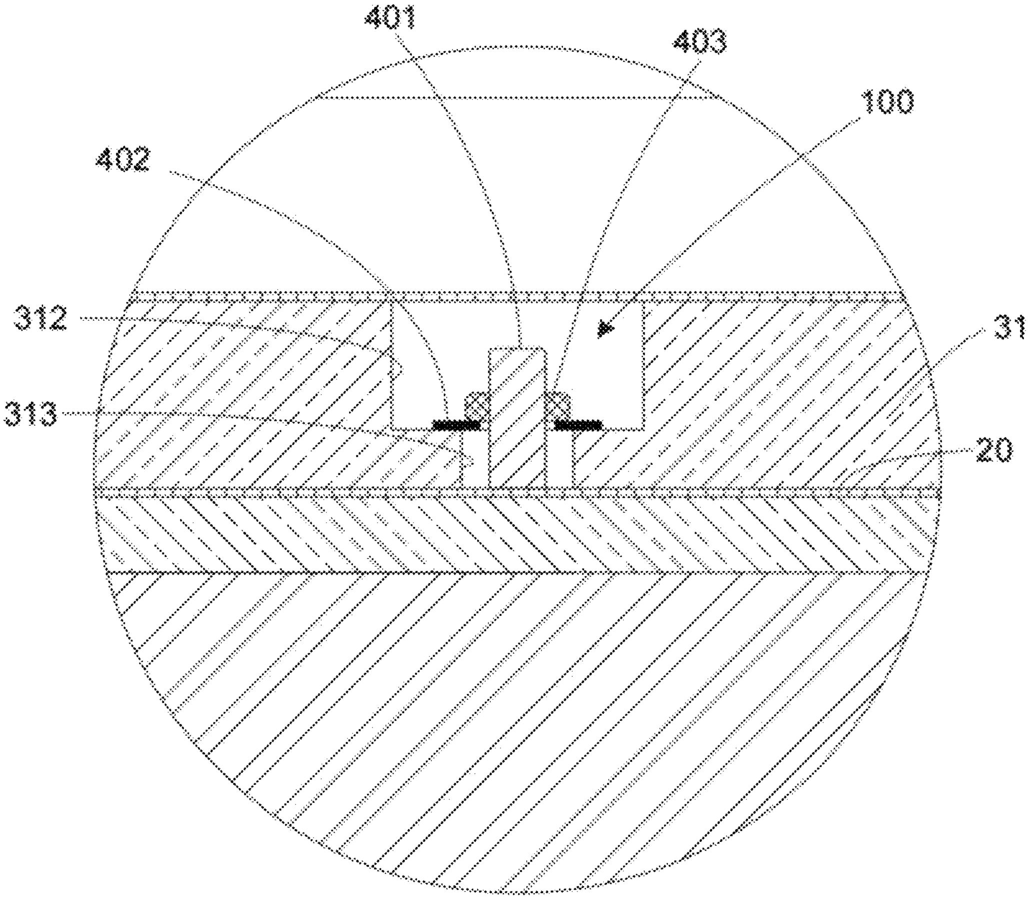
FIG. 23 is a schematic diagram of another preferred embodiment of a first connecting device.
Figure 24:
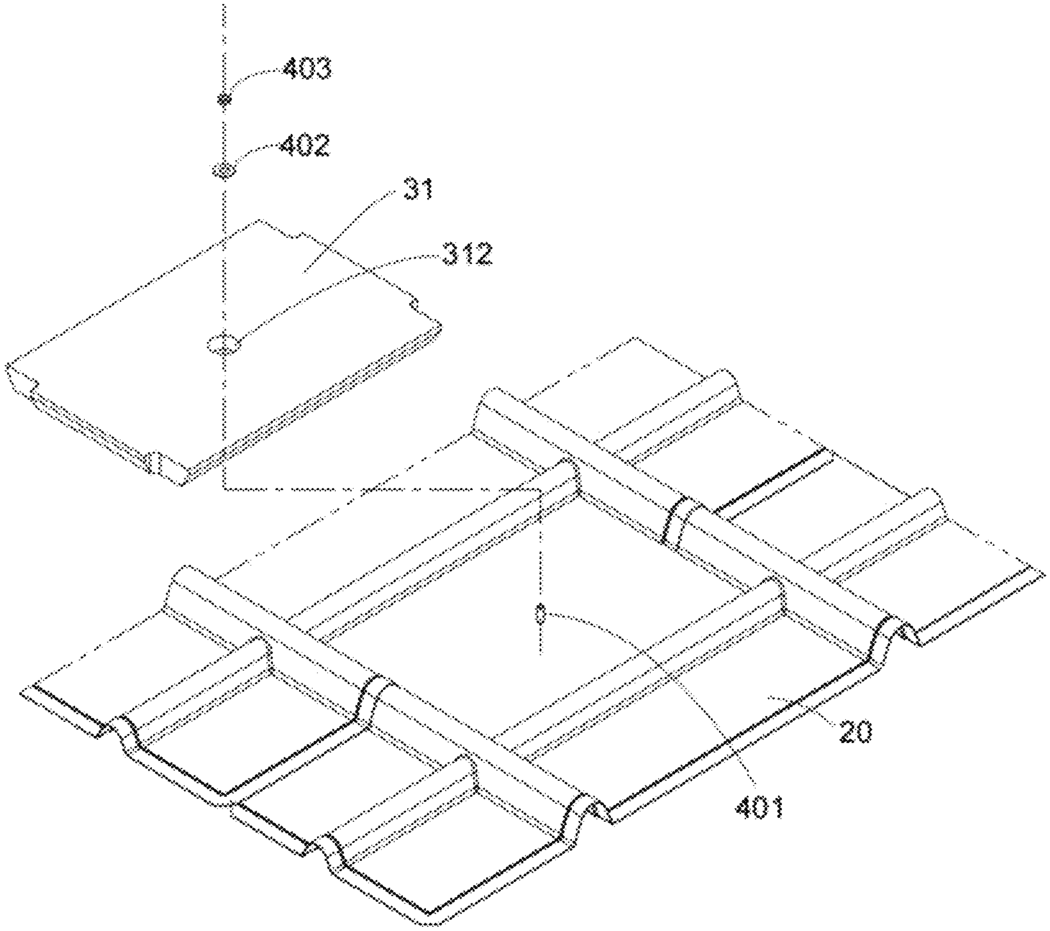
FIG. 24 is an exploded schematic diagram of the first connecting device shown in FIG. 23.

FIGS. 23 and 24 show a first connecting device 100 according to another preferred embodiment, where various layers of the integrated installation structure carries the same reference numerals as the embodiment shown in FIG. 3. In the embodiments of FIGS. 23 and 24, the first connecting device 100 includes a first connecting post 401 fixed on the secondary shielding film 20 and an anchoring gasket 402 disposed on the first primary insulating plate 31. The first connecting post 401 is disposed on the inner side surface of the secondary shielding film 20 facing the primary insulating layer; one end of the first connecting post 401 may be connected and fixed to the secondary shielding film 20 by welding or the like; and the other end thereof may be provided with a connecting feature for cooperating with a second fastener 403. In the illustrated embodiment, the second fastener 403 includes a nut, and accordingly, the connecting feature of the first connecting post 401 may include a threaded portion. It may be understood that when the second fastener 403 is configured in a different form from the nut, the connecting feature may vary accordingly with the specific form of the second fastener 403.

The anchoring gasket 402 is approximately configured as a plate-like structure and has a hole for the first connecting post 401 to penetrate through. For example, the anchoring washer 402 may be specifically configured as the form of a gasket or washer. Similar to the embodiment shown in FIG. 3, a second recess 312 is disposed on an inner side surface of the first primary insulating plate 31, and an anchoring hole 313 penetrating through the first primary insulating plate 31 is disposed in a bottom surface of the first primary insulating plate 31. During prefabrication, the first primary insulating plate 31 is disposed on an inner side surface of the secondary shielding film 20, so that the first connecting post 401 penetrates through the anchoring hole 313 and its end is located in the second recess 312. Then the anchoring gasket 402 may be put into the second recess 312, and the first connecting post 401 is sleeved with the anchoring gasket 402. Then the second fastener 403 may be installed at the end of the first connecting post 401 and pressed against the anchoring gasket 402 to realize the tight connection. The anchoring gasket 402 is supported by the bottom surface of the second recess 312.

It may be understood that the first anchor 101 and the anchoring gasket 402 may be collectively referred to as a first anchoring element, and the first fastener 105 and the second fastener 403 may be collectively referred to as a first fastening element, for the purpose of distinguishing from the similar structure of the second connecting device.

Figure 8:
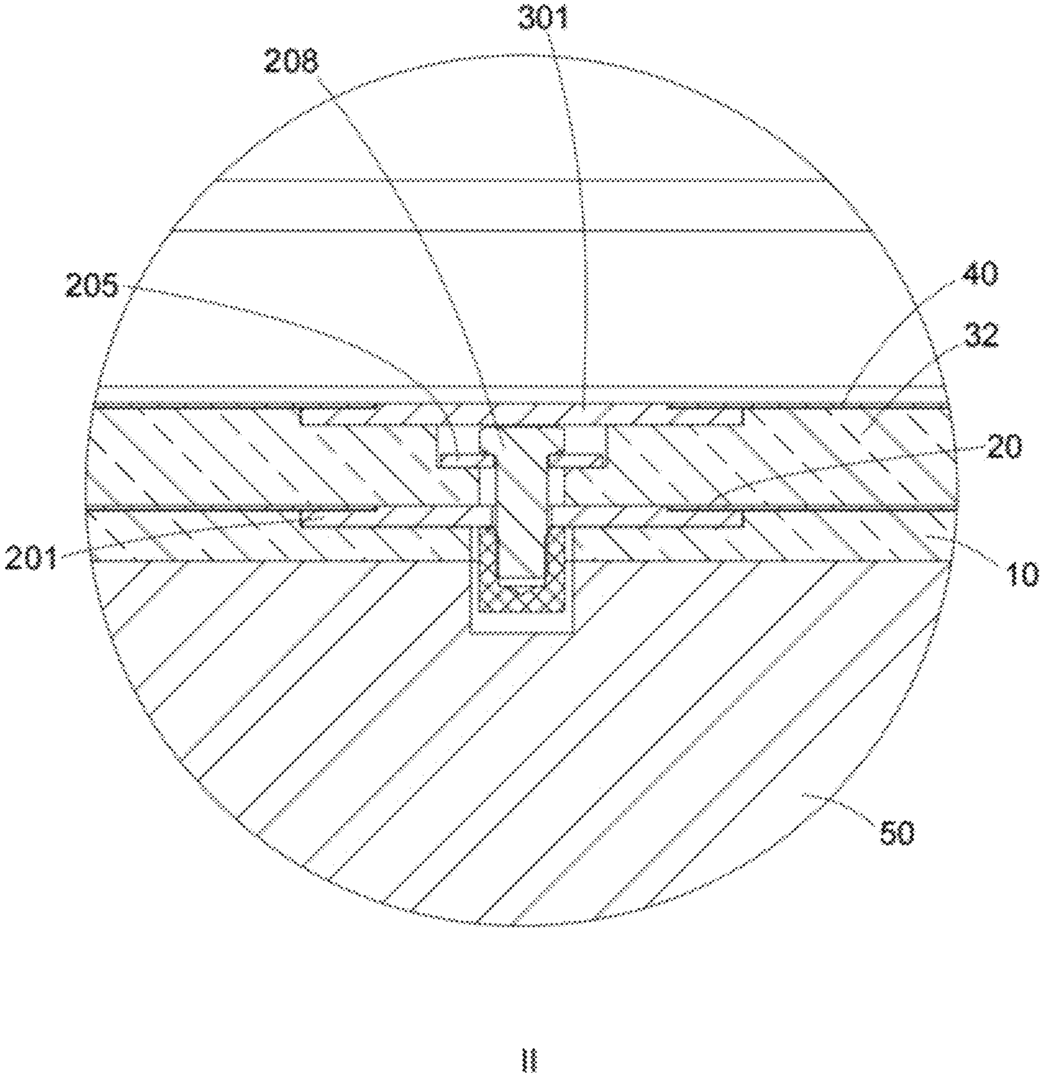
FIG. 8 is a partial enlarged diagram of a portion II in FIG. 2.

FIGS. 2 and 8 show a second connecting device 200 according to a preferred embodiment. In addition to connecting the secondary shielding film 20 to the second primary insulating plate 32 of the primary insulating layer 30, the second connecting device 200 connects the secondary insulating layer 10 to both of them. According to the present application, the first connecting device 100 may be disposed such that it may be prefabricated in the factory before the on-site construction of the storage container, and different from the first connecting device 100, the second connecting device 200 needs to be disposed on the construction site.

Figure 12:
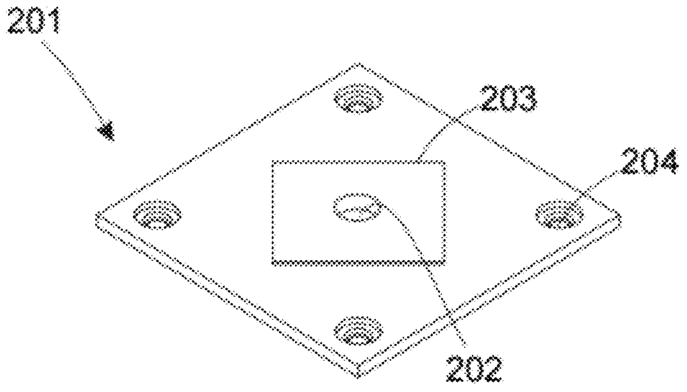
FIG. 12 is a schematic diagram of a preferred embodiment of a second outer anchoring element.
Figure 15:
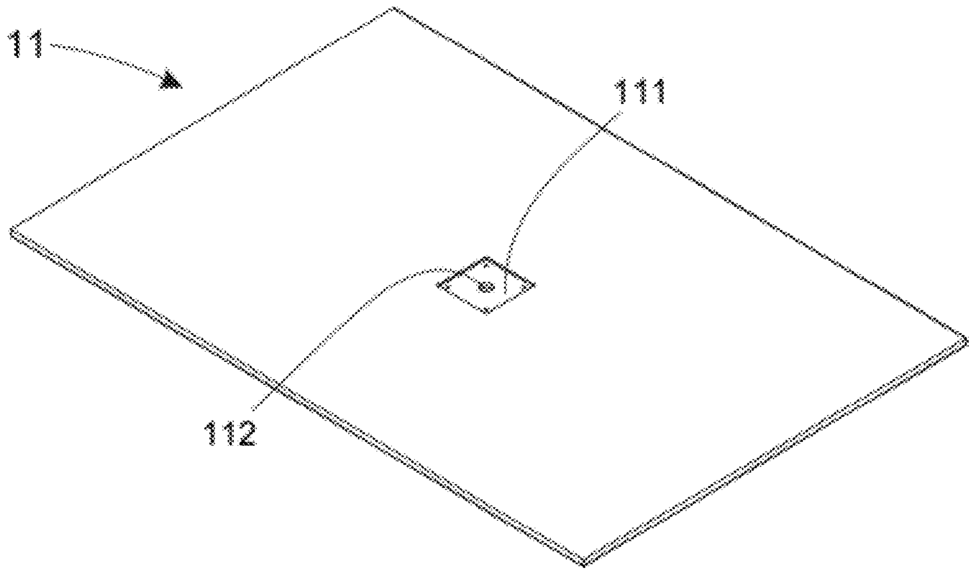
FIG. 15 is a schematic diagram of a preferred embodiment of a secondary insulating plate.
Figure 16:
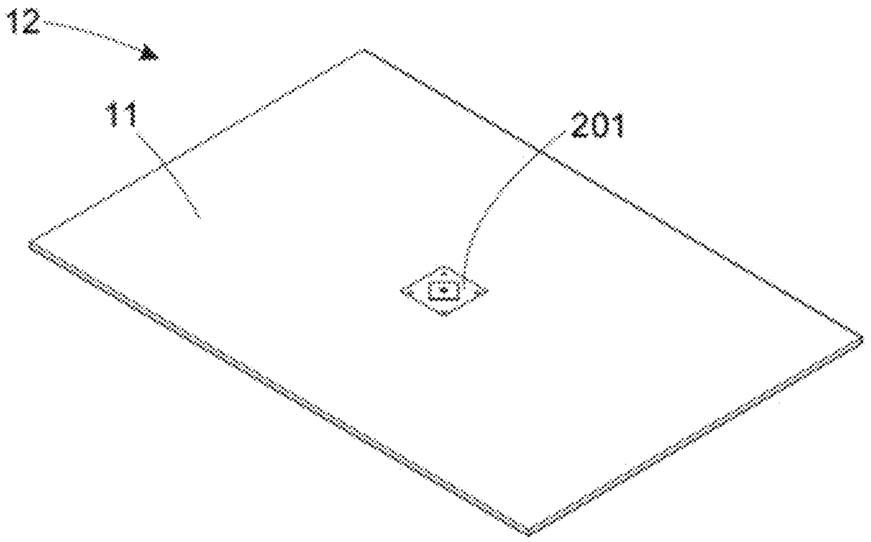
FIG. 16 is a schematic diagram of an assembly formed by installing a second outer anchoring element to a secondary insulating plate.
Figure 17:
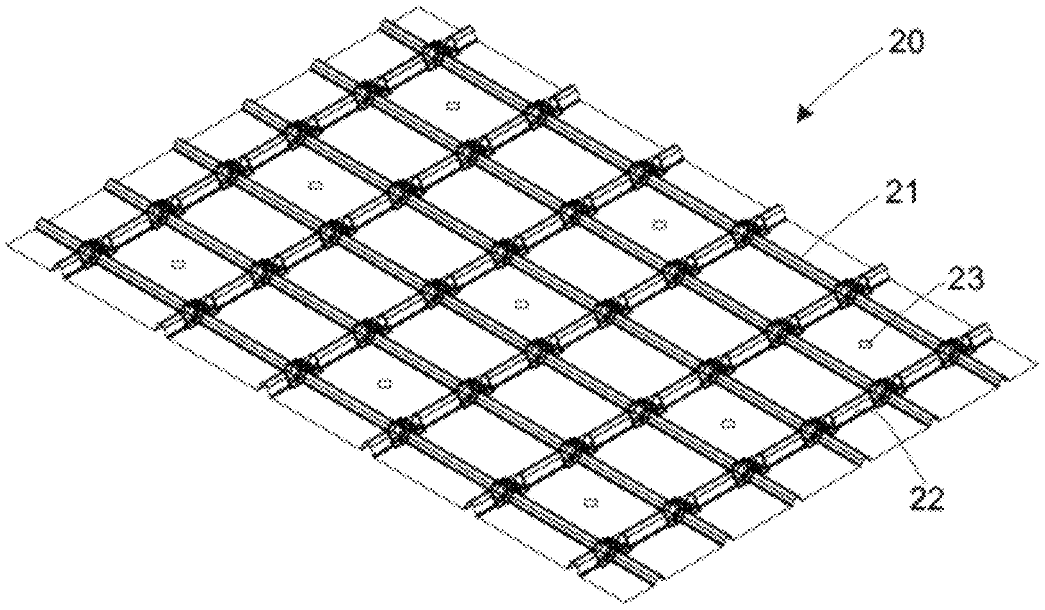
FIG. 17 is a schematic diagram of a secondary shielding film.
Figure 18:
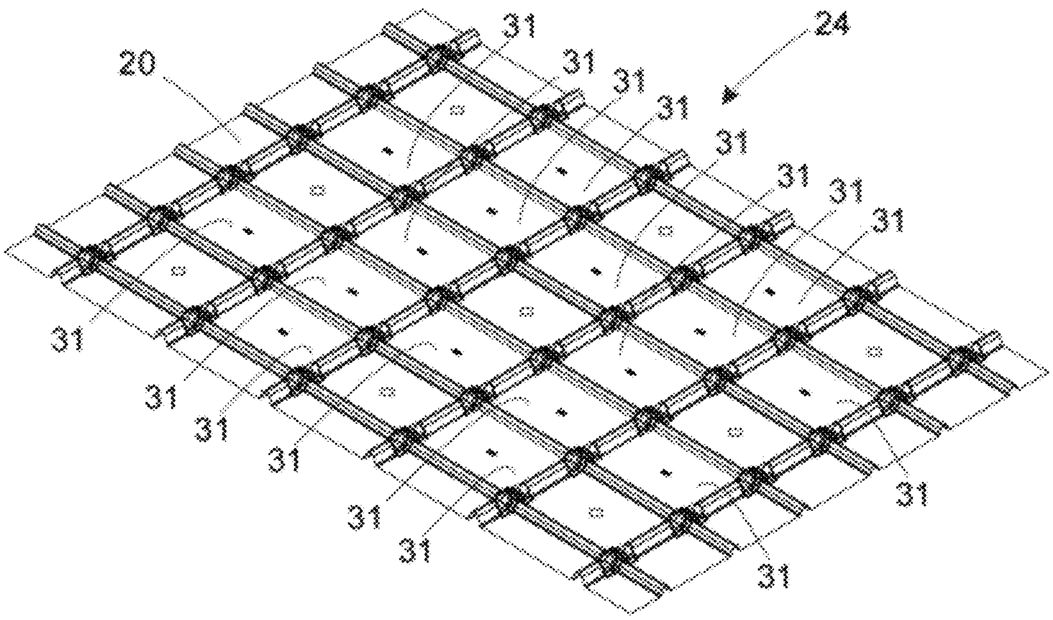
FIG. 18 is a schematic diagram of a one-piece member formed by prefabricating and connecting a secondary shielding film and a first primary insulating plate.

Particularly, the second connecting device 200 includes a second secondary anchor 201, a second primary anchor 205 and a third fastener 208, where the second secondary anchor 201 is connected to the secondary insulating layer 10. More particularly, the secondary insulating layer 10 is formed by arranging a plurality of secondary insulating plates 11. As shown in FIGS. 15 and 16, the secondary insulating plate 11 may also be configured in the form of a wood plywood, where a first installation slot 111 is disposed in an inner side surface of the secondary insulating plate 11 facing the secondary shielding film 20. The second secondary anchor 201 is embedded in the first installation slot 111. Referring to FIG. 12, the second secondary anchor 201 is approximately configured as a plate-like structure, which is provided with a first fixing hole 202 for the third fastener 208 to penetrate through. Preferably, in the case where the second secondary anchor 201 is embedded in the first installation slot 111, the surface of the plate-like structure is approximately flush with the inner side surface of the secondary insulating plate 11. Preferably, the second secondary anchor 201 may be more firmly embedded in the first installation slot 111 through additional fasteners such as screws or rivets, etc. As such, the second secondary anchor 201 is provided with an installation hole 204 for the additional fastener to penetrate through. Preferably, the operation of installing the second secondary anchor 201 to the secondary insulating plate 11 may be completed in the factory.

Figure 13:
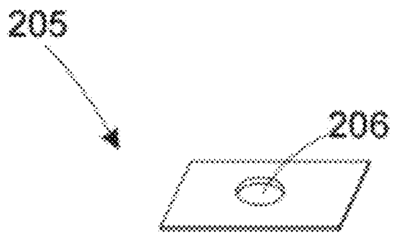
FIG. 13 is a schematic diagram of a preferred embodiment of a second inner anchoring element.

The second primary anchor 205 is disposed on the second primary insulating plate 32. As shown in FIG. 13, in some embodiments, the second primary anchor 205 may be configured as a plate-like structure and has a second fixing hole 206 for the third fastener 208 to penetrate through. Referring to FIGS. 8 to 11, a third recess 321 is disposed at the inner side surface of the second primary insulating plate 32, and a second anchoring hole 322 penetrating through the second primary insulating plate 32 is disposed in the bottom surface of the third recess 321. The second primary anchor 205 is disposed in the third recess 321 and supported by its bottom surface. In this way, the second primary anchor 205 may be fixed by a simple way, so that additional fasteners for fixing the primary anchor are omitted, which is favorable to reducing the weight of the wall of the storage container and facilitates installation.

Moreover, the secondary shielding film 20 is provided with a through hole 23 at a position corresponding to the secondary anchor 201. After the second primary insulating plate 32 is installed in place, the third fastener 208 may be configured to sequentially penetrate through (or reversely penetrate through) the second fixing hole 206 of the second primary anchor 205, the second anchoring hole 322 of the second primary insulating plate 32, the through hole 23 of the secondary shielding film 20 and the first fixing hole 202 of the second secondary anchor 201, so as to securely connect the second primary insulating plate 32, the secondary shielding film 20 and the secondary insulating plate 11 together. In some embodiments, the third fastener 208 may include a screw and a nut. Depending on the actual design, the nut may be located on a side of the secondary insulating plate 11 or on a side of the second primary insulating plate 32. In some embodiments, the screw or the nut may also be configured as a structure integrated with the second anchor 201. It may be understood that in other embodiments, the third fastener 208 may also be include a screw, a rivet, a pin or any other parts suitable for fastening two or more separated elements into a whole. As can be seen from FIG. 8, the third fastener 208 has a cap for blocking and fastening formed on the inner side of the second primary anchor 205. Preferably, the cap is completely accommodated in the third recess 321, i.e., it is below the inner side surface of the second primary insulating plate 32. In this way, the interfere to the subsequent fitting between the primary shielding film 40 and the primary insulating layer 30 caused by the third fastener 208 may be prevented.

Figure 25:
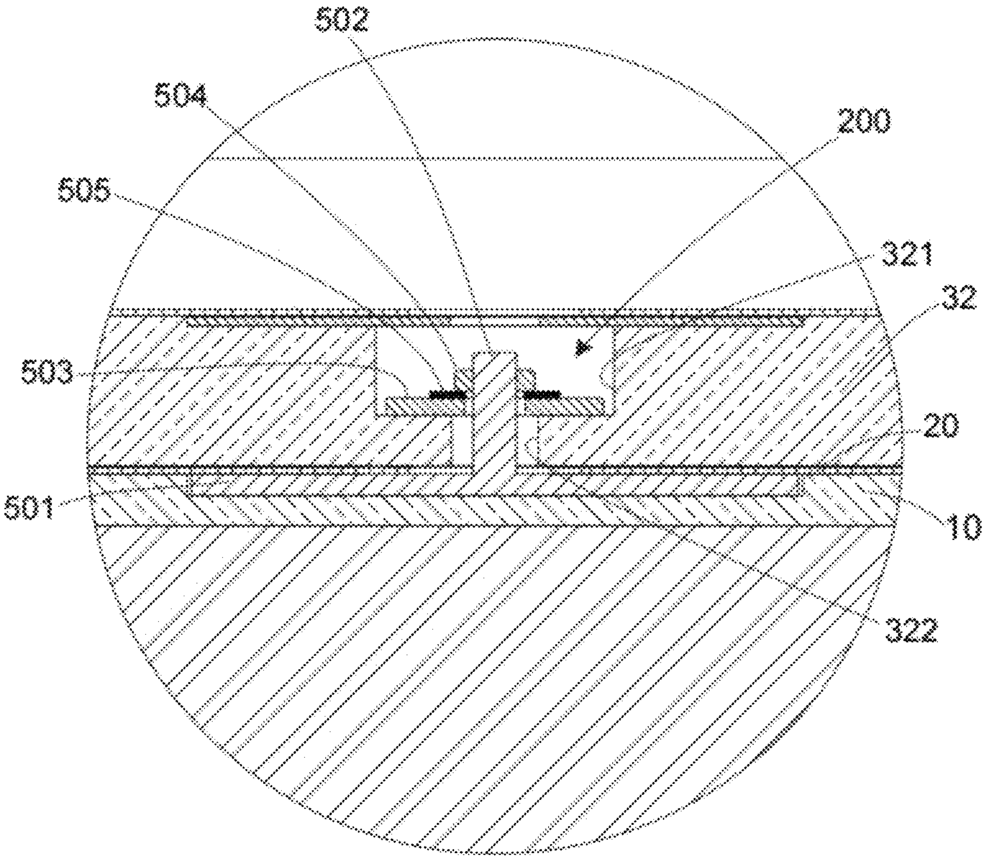
FIG. 25 is a schematic diagram of another preferred embodiment of a second connecting device.
Figure 26:
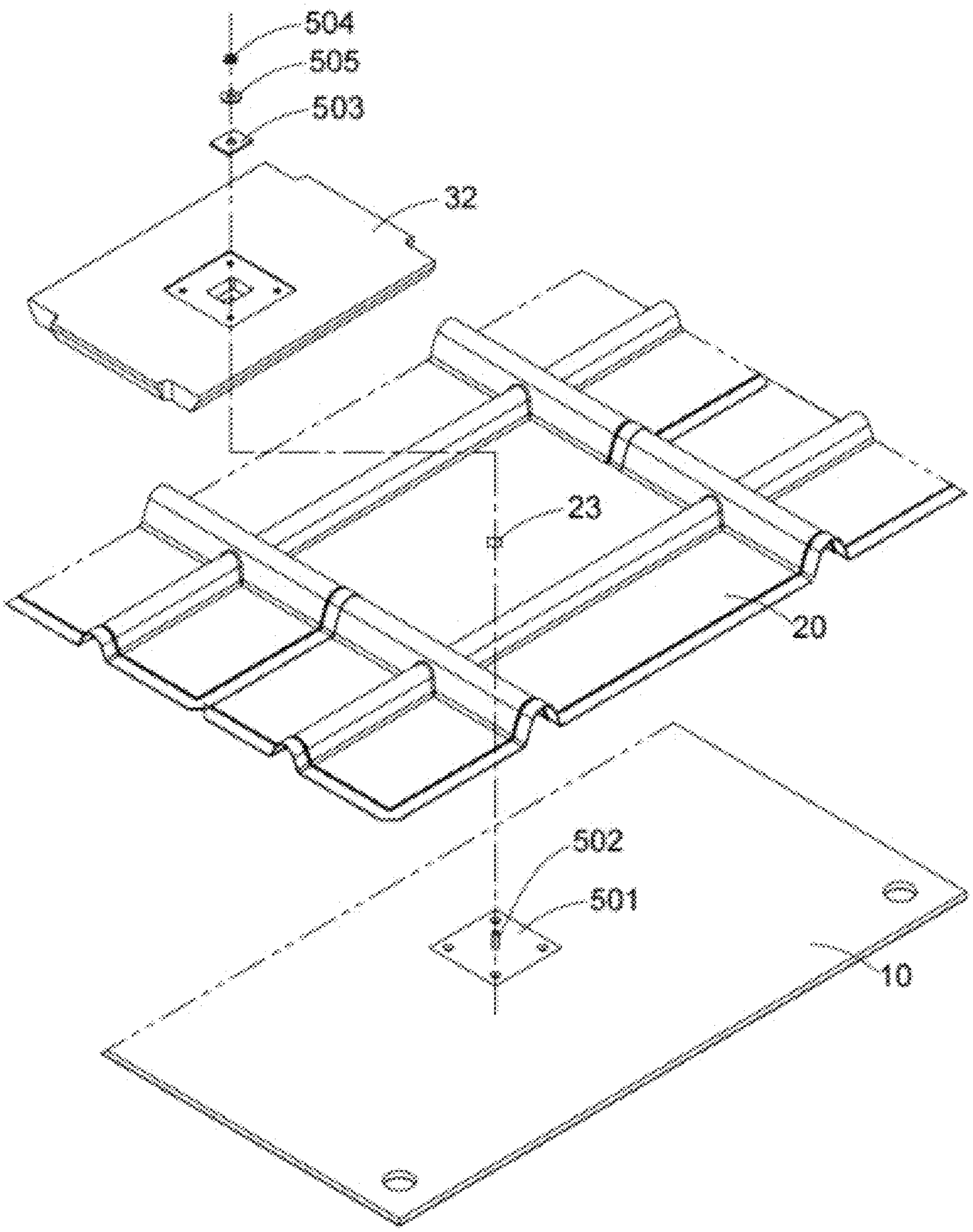
FIG. 26 is an exploded schematic diagram of the second connecting device shown in FIG. 25.

FIGS. 25 and 26 show a second connecting device 200 according to another preferred embodiment. Various layers of the integrated installation structure carries the same reference numerals as the embodiment shown in FIG. 8. In the embodiments shown in FIGS. 25 and 26, a second connecting post 502 protruding toward the secondary shielding film 20 is disposed on an inner side surface of a third secondary anchor 501. The second connecting post 502 may be fixed on a body structure of the third secondary anchor 501 by welding, or may be integrally formed with the third secondary anchor 501. The end of the second connecting post 502 may be provided with a connecting feature for mating with a fourth fastener 504. In the illustrated embodiment, the fourth fastener 504 includes a nut, and accordingly, the connecting feature of the second connecting post 502 may include a threaded portion. It may be understood that when the fourth fastener 504 is configured in a different form from the nut, the connecting feature may vary accordingly with the specific form of the fourth fastener 504.

The method of fixing the third secondary anchor 501 on the secondary insulating plate may be approximately the same as that of the second secondary anchor 201 in the embodiment shown in FIG. 8. The third primary anchor 503 may have approximately the same structure and arrangement as the second primary anchor 205 in the embodiment shown in FIG. 8.

During assembly, the secondary shielding film 20 is first laid on the secondary insulating layer 10, so that the second connecting post 502 of the third secondary anchor 501 penetrates through the through hole 23 in the secondary shielding film 20. Then the second primary insulating plate 32 is laid on the inner side surface of the secondary shielding film 20, and the second connecting post 502 penetrates through the second anchoring hole 322. Next, the third primary anchor 503 may be placed in the third recess 321, and the second connecting post 502 is sleeved with the third primary anchor 503. Finally, the fourth fastener 504 may be connected to the end of the second connecting post 502 and pressed against the third primary anchor 503 to realize the fastening connection. Preferably, a gasket 505 may also be provided, which is clamped between the fourth fastener 504 and the third primary anchor 503. The gasket 505 may include an elastic gasket, which can provide some elasticity in an axial direction of connection and prevent the fourth fastener 504 from loosening.

It may be understood that the force borne by the second connecting device 200 is significantly greater than that of the first connecting device 100. Therefore, the size of the third primary anchor 503 in the second connecting device 200 may be larger than that of the anchoring gasket 402 of the first connecting device 100. For example, a gasket or a washer with standard specifications may be used as the anchoring gasket 402, but for the third primary anchor 503, a member with a larger size is required.

It may be understood that the second secondary anchor 201 and the third secondary anchor 501 may be collectively referred to as a second outer anchoring element, the second primary anchor 205 and the third primary anchor 503 may be collectively referred to as a second inner anchoring element, and the third fastener 208 or the fourth fastener 504 connecting both of them may be collectively referred to as a second fastening element, for the purpose of distinguishing. The second connecting post 502 and the first connecting post 401 described above may be collectively referred to as a connecting post.

Preferably, in order to facilitate the fixation and connection of the secondary shielding film 20, a bump portion 203 is provided on the inner side surface of the second secondary anchor 201, preferably at the center of the plate-like structure, and is approximately configured as a square. The through hole 23 of the secondary shielding film 20 may have approximately the same shape as and a slightly larger size than the bump portion 203. In this way, the bump portion 203 of the second secondary anchor 201 may protrude from the through hole 23, facilitating the welding operation between the bump portion 203 and the secondary shielding film 20. Further preferably, a fourth recess 323 is provided on the outer side surface of the second primary insulating plate 32 facing the secondary shielding film 20, and may have approximately the same shape and size as the through hole 23. Part of the bump portion 203 protruding beyond the secondary shielding film 20 may be accommodated in the fourth recess 323, so as to prevent the bump portion 203 from protruding excessively and interfering with the fitting between layers.

Preferably, the second secondary anchor 201 is provided with a first fixing hole 202 for the third fastener 208 to penetrate through, instead of a bolt or other structures used as the third fastener 208. In this way, during the on-site construction, after the secondary shielding film 20 is hoisted in place, a temporary fastener 302 (see FIG. 20) may be screwed into the first fixing hole 202 to temporarily fix the secondary shielding film 20, which is beneficial to the smooth welding operation. After welding, the temporary fastener 302 is removed, and the next process of laying the second primary insulating plate 32 and installing the second connecting device 200 may be carried out.

Figure 14:
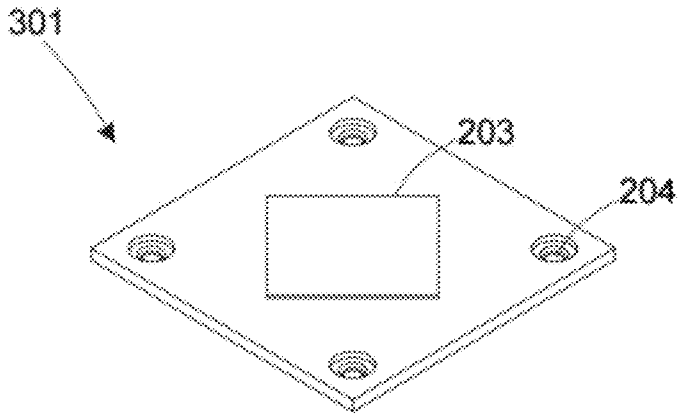
FIG. 14 is a schematic diagram of a preferred embodiment of a third anchoring element.

After the laying and installation of the second primary insulating plate 32 is completed, the primary shielding film 40 may be laid and installed. The primary shielding film 40 may be connected to the primary insulating layer 30 through a primary shielding film anchor installed on the inner side surface of the primary insulating layer 30. FIG. 14 shows a preferred embodiment of a primary shielding film anchor 301 for connecting the primary shielding film 40. It can be seen that the primary shielding film anchor 301 has a similar structure to the second secondary anchor 201 of the second connecting device 200 installed on the secondary insulating plate 11, and is also configured as a plate-like structure. After the primary shielding film 40 is hoisted in place, it can be welded and fixed with the primary shielding film anchor 301 through the through hole 23 of the primary shielding film 40, so that the primary shielding film 40 is connected to the primary insulating layer 30.

Preferably, similar to the secondary insulating plate 11, the inner side surface of the primary insulating plate for installing the primary shielding film anchor 301 described above is provided with an installation slot in which the primary shielding film anchor 301 is embedded. Further, the second secondary anchor 201 of the second connecting device 200 described above is similar, and the primary shielding film anchor 301 may be more firmly embedded in the installation slot of the primary insulating plate through additional fasteners such as screws or rivets. As such, the primary shielding film anchor 301 is provided with installation holes 204 for the additional fasteners to penetrate through, and the primary insulating plate is provided with additional installation holes for the additional fasteners to penetrate through. Preferably, in the case where the primary shielding film anchor 301 is embedded in the installation slot, the surface of its plate-like structure is approximately flush with the inner side surface of the primary insulating plate. Of course, there is no need to dispose a structure similar to that of the first fixing hole 202 at the center of the primary shielding film anchor 301.

In order to facilitate the connection of the primary shielding film 40, similar to the second secondary anchor 201, a bump portion 203 may also be provided on the primary shielding film anchor 301, which is preferably located at the center of the plate-like structure and is approximately configured as a square. The through hole 23 of the primary shielding film 40 may have approximately the same shape as and a slightly larger size than the bump portion 203. In this way, the bump portion 203 of the primary shielding film anchor 301 may protrude from the through hole 23 of the primary shielding film 40, facilitating the welding operation between the bump portion 203 and the primary shielding film 40.

Figure 9:
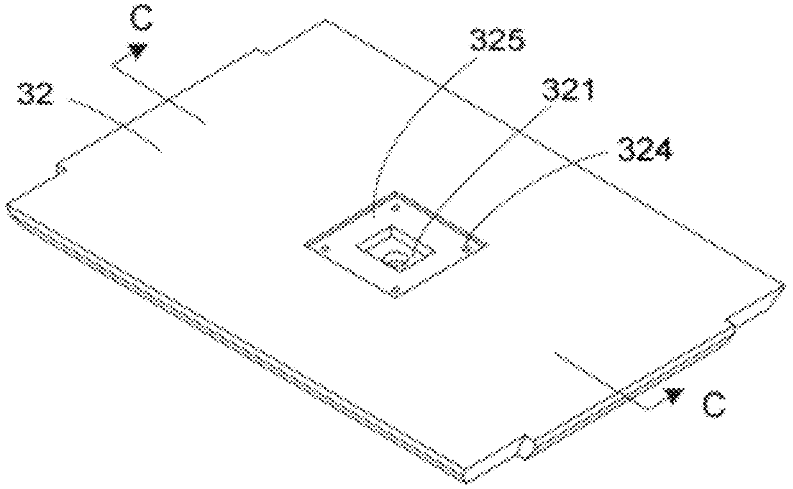
FIG. 9 is a perspective diagram of a second primary insulating plate.
Figure 10:
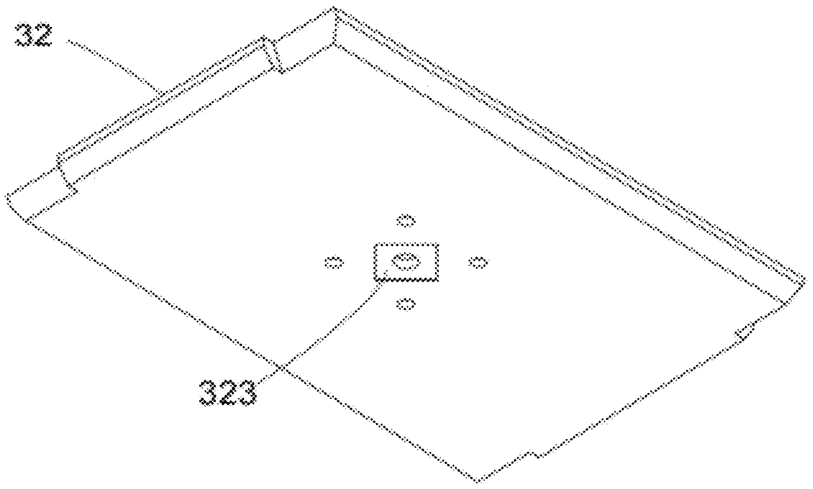
FIG. 10 is another perspective diagram of a second primary insulating plate.
Figure 11:
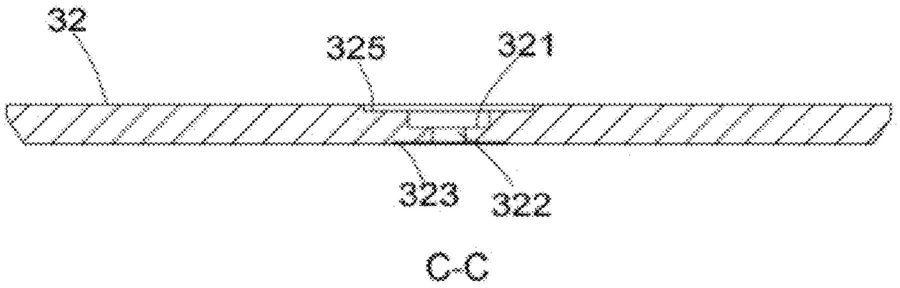
FIG. 11 is a cross-sectional view taken along a line C-C in FIG. 9.

FIG. 9 shows a second installation slot 325 and an additional installation hole 324 provided in the second primary insulating plate 32. Preferably, the second installation slot 325 is disposed at the position corresponding to the third recess 321, so that the connecting force between the layers is transferred at approximately the same position on the wall of the storage container, which is beneficial to uniform stress and avoids stress concentration. It may be understood that the structure related to the installation of the primary shielding film anchor 301 may also be provided on the first primary insulating plate 31. The installation position of the primary shielding film anchor 301 may preferably correspond to that of the first connecting device. It may be understood that the primary shielding film anchor 301 for installing the primary shielding film 40 may also be referred to as a third anchoring element for convenience of distinguishing. In addition, the second installation slot 325 and the first installation slot 111 described above may be collectively referred to as an installation slot.

The installation steps of the integrated installation structure according to the present application will be described below with reference to FIGS. 18 to 22.

First, prefabrication of some parts is completed in the processing factory, for example, the first primary insulating plate 31 is prefabricated and connected with the secondary shielding film 20 by the first connecting device to form a one-piece member 24 (see FIG. 18), and the second outer anchor 201 is installed to the secondary insulating plate 11 to form a secondary insulating plate assembly 12 (see FIG. 16), and so on. Preferably, a first primary insulating plate 31 or a second primary insulating plate 32 is disposed in each of a plurality of areas defined by longitudinal corrugations 21 and transverse corrugations 22 of the corrugated plate.

Through prefabrication, the installation steps can be transferred from the construction site to the processing factory as much as possible. On the one hand, the processing factory has a better working environment than the construction site, such as permanent production lines and safer protective measures, which can bring about higher processing efficiency, processing quality (improving the yield) and safety. On the other hand, it can also reduce the operations on the construction site, especially the aerial work, which is conducive to shortening the construction period and further improving the safety of the construction site.

Figure 19:
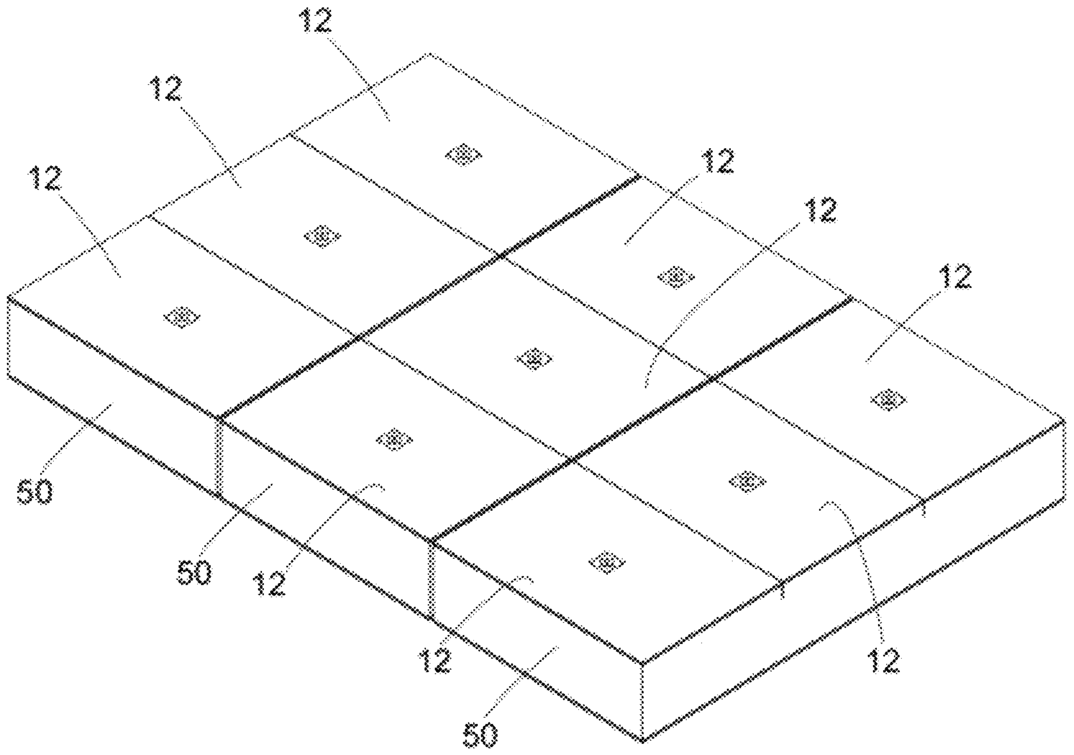
FIG. 19 is a schematic diagram of the arrangement of secondary insulating boxes.

Next, the secondary insulating plate assembly 12 may be integrally connected and bonded to the secondary insulating polyurethane layer 50 by glue bonding to form a secondary insulating box as shown in FIG. 19. According to the actual situation, this step may be carried out on the construction site or carried out in advance in the processing factory.

Figure 20:
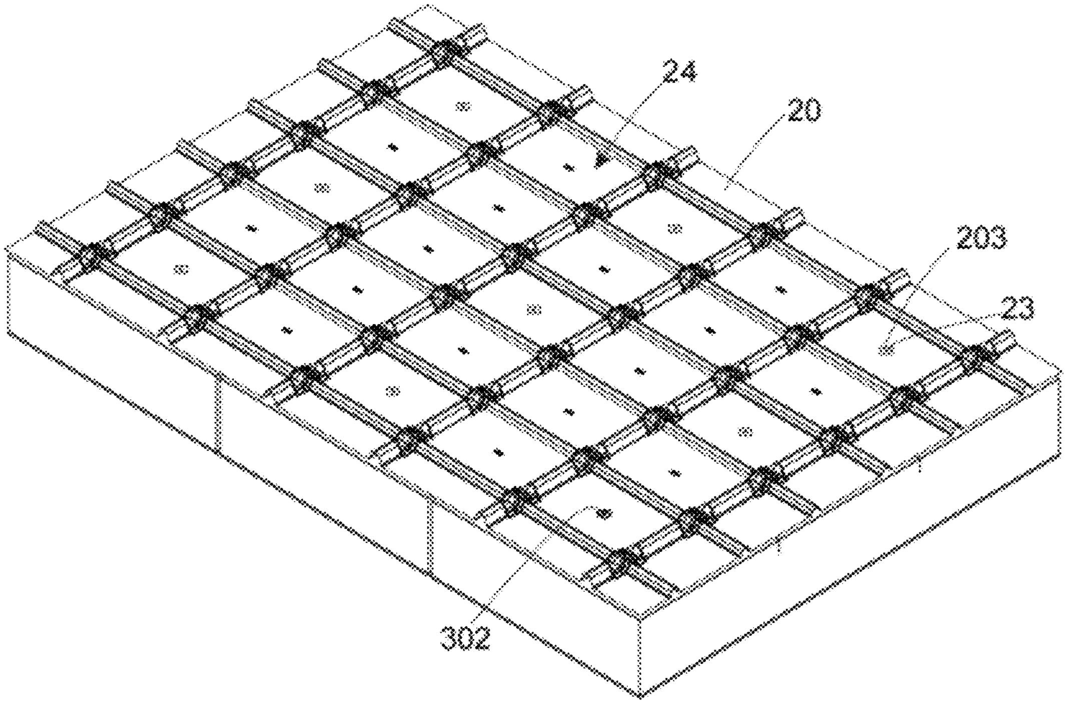
FIG. 20 is a schematic diagram of laying the one-piece member shown in FIG. 18 to a secondary insulating box.

Then, as shown in FIG. 20, the first primary insulating plate 31 and the secondary shielding film 20 may be prefabricated to form a one-piece member 24 which is installed to the secondary insulating box. Preferably, after the one-piece member 24 is hoisted in place, the one-piece member 24 may be temporarily fixed by screwing the temporary fastener 302 into the first fixing hole 202 of the second outer anchor 201 in the secondary insulating plate 11, so as to complete the welding and fixation between the secondary shielding film 20 and the bump portion 203 of the second outer anchor 201.

Figure 21:
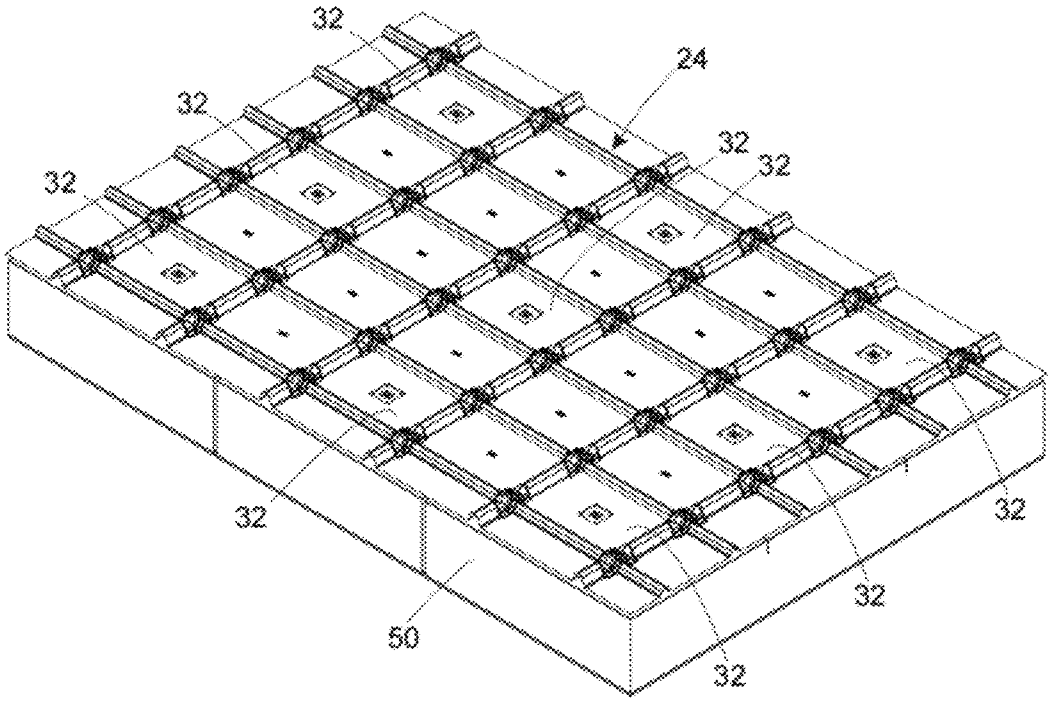
FIG. 21 is a schematic diagram of installing a second primary insulating plate on the basis of FIG. 20.

After welding, the temporary fastener 302 may be removed and the second primary insulating plate 32 may be installed in place through the second connecting device 200. As shown in FIG. 21, in the primary insulating layer 30, two aspects should be taken into account for the arrangement of the first primary insulating plate 31 and the second primary insulating plate 32: firstly, the number of the second primary insulating plates 32 is reduced as much as possible to reduce the operations of the primary insulating layer 30 on the construction site; and secondly, it is necessary to take into account that the number of connections between the primary insulating layer 30 and the secondary insulating layer 10 (that is, the number of the second primary insulating plates 32) can provide sufficient strength, and the connecting force between them both is evenly distributed (i.e., enough second primary insulating plates are arranged dispersedly). Specifically, the arrangement may be such that each second primary insulating plate 32 is arranged adjacent to at least one first primary insulating plate 31, and/or any two second primary insulating plates 32 are not adjacent.

Figure 22:
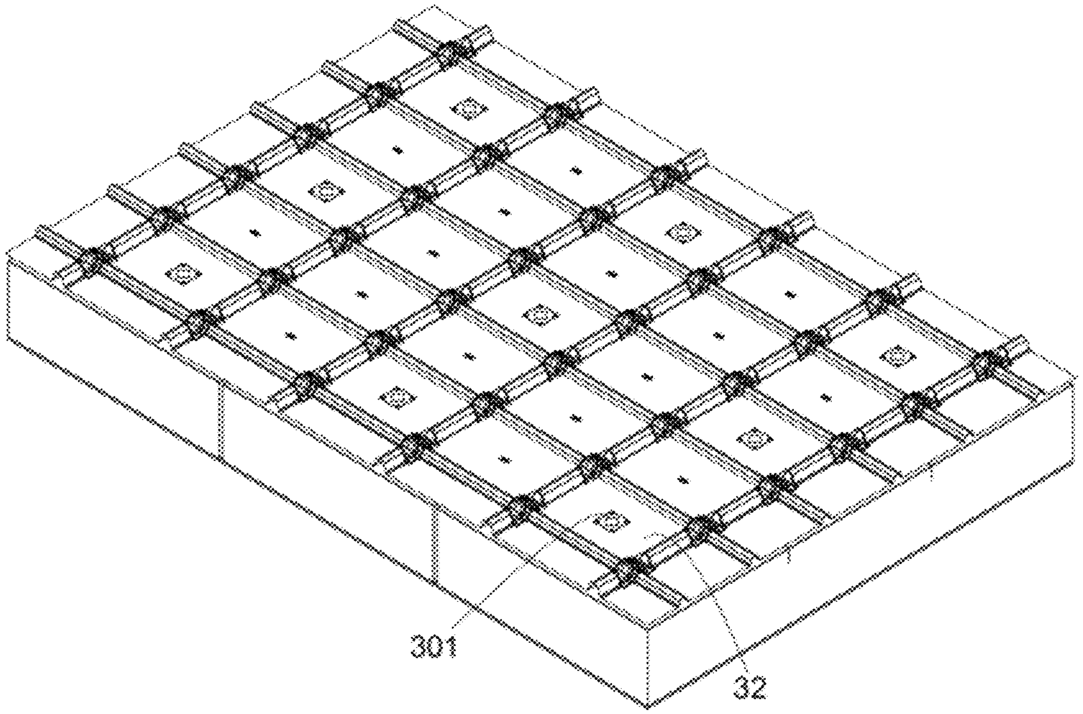
FIG. 22 is a schematic diagram of installing a third anchoring element on the basis of FIG. 21.

After the installation of the second primary insulating plate 32 is completed, as shown in FIG. 22, the primary shielding film anchor 301 is installed to the corresponding first primary insulating plate 31 and/or second primary insulating plate 32. Thereafter, the primary shielding film 40 may be hoisted in place and welded with the bump portion 203 of the primary shielding film anchor 301 through the through hole 23 of the primary shielding film 40, so that the primary shielding film 40 and the primary insulating layer 30 may be connected together. The integrated installation structure 1 after the installation of the primary shielding film 40 is as shown in FIG. 1.

In another aspect, the present application further provides a storage container including the integrated installation structure 1 described in any one of the above embodiments, where the integrated installation structure 1 forms part of a container wall of the storage container. In particular, the storage container may be configured to store liquefied gases, such as liquefied natural gas, liquid nitrogen, liquid oxygen, liquid hydrogen, liquid ammonia and liquid helium, etc.

In some embodiments, the storage container is a large land-based storage tank. The storage container is applicable to both a marine apparatus and a large land-based storage tank.

The above description of various embodiments of the present application is provided for the purpose of description to a person of ordinary skill in the relevant art. It is not intended to make the present application exclusive or limitative to a single disclosed embodiment. As above, a person of ordinary skill in the art as taught above will recognize various substitutions and variations of the present application. Therefore, although some alternative embodiments are described in detail, a person of ordinary skill in the art will recognize or relatively easily develop other embodiments. The present application is intended to include all substitutions, modifications, and variations of the present application as described herein, as well as other embodiments falling within the spirit and scope of the present application as described above.

What is claimed is:

1. An integrated installation structure for a marine apparatus, wherein the integrated installation structure is configured to constitute at least part of a wall of a storage container, and comprises:

- a primary insulating layer formed by arranging at least one first primary insulating plate and at least one second primary insulating plate;
- a secondary insulating layer that is disposed on an outer side of the primary insulating layer defined according to the storage container, and is formed by arranging a secondary insulating plate; and
- a secondary shielding film disposed between the primary insulating layer and the secondary insulating layer, wherein the first primary insulating plate is prefabricated and connected with the secondary shielding film into a one-piece member through a first connecting device, and the second primary insulating plate is a structure separated from the secondary shielding film, and is connected with the secondary insulating plate through a second connecting device;
- the first connecting device comprises:
  - a first connecting post connected to an inner side surface of the secondary shielding film;
  - a first anchoring element disposed on the first primary insulating plate, wherein the first connecting post penetrates through the first anchoring element; and
  - a first fastening element connected to the first connecting post at an inner side of the first anchoring element so as to fasten the first anchoring element and the secondary shielding film together; or
- the first connecting device comprises:
  - a first anchoring element connected to an inner side surface of the secondary shielding film; and
  - a first fastening element penetrating through the first primary insulating plate and the first anchoring element to fasten the first primary insulating plate and the first anchoring element together.

2. The integrated installation structure of claim 1, wherein each second primary insulating plate is arranged adjacent to at least one of the first primary insulating plates, and/or any two of the second primary insulating plates are not adjacent.

3. The integrated installation structure of claim 1, wherein a first recess is disposed at an outer side surface of the first primary insulating plate facing the secondary shielding film, and at least part of the first anchoring element is accommodated in the first recess when the first primary insulating plate and the secondary shielding film are prefabricated and connected into the one-piece member.

4. The integrated installation structure of claim 3, wherein the first anchoring element comprises a flat plate portion connected to the secondary shielding film and a ridge portion protruding relative to the flat plate portion, and the first fastening element penetrates through the first primary insulating plate and is securely connected to the ridge portion.

5. The integrated installation structure of claim 1, wherein the first fastening element comprises a connecting post and a cap at an end of the connecting post, wherein a second recess is disposed at an inner side surface of the first primary insulating plate facing away from the secondary shielding film, and the cap is accommodated in the second recess and is below the inner side surface of the first primary insulating plate.

6. The integrated installation structure of claim 1, wherein a second recess is disposed at an inner side surface of the first primary insulating plate facing away from the secondary shielding film, wherein the first anchoring element is disposed in the second recess and supported by a bottom surface of the second recess.

7. The integrated installation structure of claim 6, wherein the first fastening element is accommodated in the second recess and is below the inner side surface of the first primary insulating plate.

8. The integrated installation structure of claim 1, wherein the second connecting device comprises:

a second outer anchoring element disposed on an inner side surface of the secondary insulating plate facing the secondary shielding film, a second inner anchoring element disposed on the second primary insulating plate, and a second fastening element, wherein the secondary shielding film has a through hole, and the second fastening element penetrates through the second inner anchoring element and the secondary shielding film from an inner side of the second inner anchoring element and is connected to the second outer anchoring element, thereby fastening the second primary insulating plate, the secondary shielding film and the secondary insulating plate together.

9. The integrated installation structure of claim 8, wherein the second outer anchoring element is configured as a plate structure provided with a first fixing hole, wherein the second fastening element penetrates through the first fixing hole and is securely connected to a nut, or the first fixing hole has a threaded portion disposed therein and the second fastening element is connected to the first fixing hole through the threaded portion.

10. The integrated installation structure of claim 9, wherein the plate structure is provided with a bump portion protruding from an inner side surface facing the secondary shielding film; the through hole of the secondary shielding film has approximately the same shape as the bump portion for the bump portion to penetrate through; and the secondary shielding film is welded to the bump portion.

11. The integrated installation structure of claim 10, wherein a fourth recess configured to accommodate at least part of the bump portion is disposed at an outer side of the second primary insulating plate facing the secondary shielding film.

12. The integrated installation structure of claim 1, wherein the second connecting device comprises:

a second inner anchoring element disposed on the second primary insulating plate, a second outer anchoring element disposed on an inner side surface of the secondary insulating plate facing the secondary shielding film, wherein the second outer anchoring element has a second connecting post extending towards the secondary shielding film and penetrating through the secondary shielding film and the second inner anchoring element; and a second fastening element connected to the second connecting post at an inner side of the second inner anchoring element so as to fasten the second primary insulating plate, the secondary shielding film and the secondary insulating plate together.

13. The integrated installation structure of claim 12, wherein the second outer anchoring element is configured as a plate structure, the second connecting post is welded to the plate structure, or the second connecting post and the plate structure are integrally formed.

14. The integrated installation structure of claim 9, wherein an installation slot is disposed at the inner side surface of the secondary insulating plate, and the plate structure is embedded and fastened in the installation slot through additional fasteners.

15. The integrated installation structure of claim 8, wherein a third recess is disposed at the inner side surface of the second primary insulating plate facing away from the secondary shielding film, an anchoring hole penetrating through the second primary insulating plate is disposed in a bottom surface of the third recess, and the second inner anchoring element is disposed in the third recess and supported by the bottom surface of the third recess.

16. The integrated installation structure of claim 15, wherein the second fastening element comprises or forms a cap located at an inner side of the second inner anchoring element, and the second inner anchoring element and the cap of the second fastening element are both accommodated in the third recess and are below the inner side surface of the second primary insulating plate.

17. The integrated installation structure of claim 1, further comprising:

a primary shielding film disposed on an inner side of the primary insulating layer facing away from the secondary shielding film;

wherein a third anchoring element is disposed at inner side surfaces of the first primary insulating plate and/or the second primary insulating plate facing the primary shielding film, and the primary shielding film is connected to the third anchoring element.

18. The integrated installation structure of claim 17, wherein the position of the third anchoring element disposed at the first primary insulating plate coincides with the first connecting device along a thickness direction of the first primary insulating plate, and/or the position of the third anchoring element disposed at the second primary insulating plate coincides with the second connecting device along the thickness direction of the first primary insulating plate.

19. The integrated installation structure of claim 17, wherein the third anchoring element is configured as a plate structure which is provided with a bump portion protruding from an inner side surface facing the primary shielding film, and the primary shielding film is provided with a through hole for the bump portion to penetrate through, which has approximately the same shape as the bump portion.

20. The integrated installation structure of claim 19, wherein an installation slot is disposed at the inner side surfaces of the first primary insulating plate and/or the second primary insulating plate at which the third anchoring element is provided, and the plate structure is embedded and fastened in the installation slot through additional fasteners.

21. The integrated installation structure of claim 1, wherein the secondary shielding film is configured as a corrugated plate made of a metal material; a plurality of transverse corrugations and a plurality of longitudinal corrugations are formed on the corrugated plate; two adjacent ones of the transverse corrugations and two adjacent ones of the longitudinal corrugations intersect to define one installation area; and one first primary insulating plate or one second primary insulating plate is disposed in each of the installation areas.

22. A storage container, comprising the integrated installation structure of claim 1, wherein the integrated installation structure forms part of a container wall of the storage container.

23. The storage container of claim 22, wherein the storage container is a land-based storage tank.

24. A manufacturing method for the storage container of claim 22, comprising:

manufacturing the secondary insulating layer;

manufacturing a prefabricated one-piece member including the secondary shielding film and the first primary insulating plate;

installing the secondary insulating layer to form a secondary insulating box;

fixing the prefabricated one-piece member on an inner side surface of the secondary insulating layer;

laying the second primary insulating plate on an inner side surface of the secondary shielding film and connecting with the secondary insulating layer; and installing a primary shielding film on an inner side of the primary insulating layer.

25. The manufacturing method of claim 24, wherein a construction site of the manufacturing method at least comprises a site construction side and a factory prefabricating side, wherein at least the step of manufacturing the prefabricated one-piece member is completed at the factory prefabricating side.

* * * * *